United States Patent
Parr et al.

(10) Patent No.: US 6,703,134 B1
(45) Date of Patent: Mar. 9, 2004

(54) MULTI-LAYER FILM WITH GRAFTED SYNDIOTACTIC POLYPROPYLENE ADHESION PROMOTING LAYER

(75) Inventors: Larry A. Parr, Canandaigua, NY (US); Robert G. Peet, Pittsford, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 37 days.

(21) Appl. No.: 09/628,973

(22) Filed: Jul. 31, 2000

(51) Int. Cl.[7] .......................... B32B 15/08; B32B 27/32
(52) U.S. Cl. ...................... 428/461; 428/457; 428/463; 428/515; 428/516; 428/520; 428/910
(58) Field of Search ................................. 428/457, 461, 428/515, 516, 463, 520, 910

(56) References Cited

U.S. PATENT DOCUMENTS

| | | | |
|---|---|---|---|
| 3,202,528 A | 8/1965 | James | 428/347 |
| 4,020,228 A | 4/1977 | Eastes | 428/347 |
| 4,121,956 A | 10/1978 | Sample | 156/60 |
| 4,214,039 A | 7/1980 | Steiner et al. | 428/414 |
| 4,292,882 A | 10/1981 | Clausen | 89/36.02 |
| 4,389,450 A | 6/1983 | Schaefer et al. | 428/212 |
| 4,447,494 A | 5/1984 | Wagner, Jr. et al. | 428/349 |
| 4,888,237 A | 12/1989 | Balloni et al. | 428/347 |
| 4,961,992 A | 10/1990 | Balloni et al. | 428/332 |
| 5,019,447 A | 5/1991 | Keller | 428/327 |
| 5,049,436 A | 9/1991 | Morgan et al. | 428/213 |
| 5,057,177 A | 10/1991 | Balloni et al. | 156/244.11 |
| 5,153,074 A | 10/1992 | Migliorini | 428/463 |
| 5,326,824 A * | 7/1994 | Asanuma et al. | 525/288 |
| 5,525,690 A * | 6/1996 | Chien et al. | 526/160 |
| 5,665,820 A | 9/1997 | Leistner et al. | 525/66 |
| 5,885,703 A * | 3/1999 | Wilkie | 428/220 |
| 5,888,648 A | 3/1999 | Donovan et al. | 428/349 |
| 6,184,326 B1 * | 2/2001 | Razavi et al. | 526/351 |
| 6,503,635 B1 * | 1/2003 | Kong et al. | 428/461 |

FOREIGN PATENT DOCUMENTS

| | | |
|---|---|---|
| EP | 0536753 | 4/1993 |
| JP | 09-078046 | * 3/1997 |

OTHER PUBLICATIONS

Database WPI, Section Ch, Week 199722, Derwent Publications Ltd., London, GB; Class A17, AN 1997–241968; XP002187257 & JP 09 078046 A (Kishimoto A), Mar. 25, 1997 abstract.

* cited by examiner

Primary Examiner—Monique R. Jackson
(74) Attorney, Agent, or Firm—Rick F. James

(57) ABSTRACT

A multilayer film has a core layer, such as a biaxially oriented polypropylene layer, and an adhesion promoting layer formed from a graft copolymer of syndiotactic polypropylene and a monomer, such as maleic anhydride, which has hydrophilic functionality. The adhesion promoting layer may be metallized to provide a barrier to oxygen and water vapor. The adhesion promoting layer may also render the surface of the film more receptive to printing inks, laminating adhesives, primeness overcoats and the like.

10 Claims, 1 Drawing Sheet

MULTI-LAYER FILM WITH GRAFTED SYNDIOTACTIC POLYPROPYLENE ADHESION PROMOTING LAYER

BACKGROUND

The present invention relates to multi-layer films. For example, there is provided a new composite multi-layer package film having an oxygen and water vapor barrier.

Packaging technology has over the years required the development of many disciplines. Currently, packaging technologists integrate elements of engineering, chemistry, food science, metallurgy, and other technologies in order to provide the consumer fresh, healthy food product. In those cases where packages are prepared from multi-layer film, it is desirable to be able to provide a barrier which does not permit passage of air or water vapor.

In recent years, containers produced out of multiple-layer flexible film, such as bags and pouches, predominate the marketplace. In order to utilize continuous multiple-layer flexible film, the industry generally employs form/fill/seal packaging techniques. The type of product packaged dictates whether or not the technique will include horizontal form/fill/seal packaging (HFFS) or vertical form/fill/seal packaging (VFFS).

It is important for the packaging artisan to be able to select a multi-layer film having optimum barrier properties for storage of the food items and be confident of providing a high quality seal using high speed packaging apparatus. For example, it is known that stereoregular polypropylene, e.g., oriented polypropylene, is quite useful in the manufacture of packages from flexible films. Using oriented polypropylene as a core layer, additional layers in the way of coatings, co-extrusions, laminations, and combinations thereof are added to improve barrier properties of the film. Modifications of the polypropylene polymer can also be used to improve barrier properties. In certain cases, films can be prepared which exclude moisture and oxygen, but permit the passage of light. In other cases, it is also important to prevent light from passing through the film barrier.

A primary concern for designing multiple-layer films for packaging is to ensure they can be processed on high speed form/fill/seal machinery. Form/fill/seal package apparatus operates by unwinding continuous film from bulk film rolls, followed by forming pouches therefrom, filling the pouches, and, finally, sealing the pouch closed. Thus, the film must have sufficient flexibility to undergo machine folding from a flat orientation to a folded condition, and be subjected to a sealing function which is part of high-speed packaging apparatus. In selecting the optimum multi-layer film for its barrier properties, high-speed unrolling and folding are one of many concerns. An additional, and very important aspect of the packaging process, however, is the ability to effectively seal the pouch after it is filled with the product.

High-speed horizontal and vertical form/fill/seal apparatus include sealing functions at various stages of the packaging process. In a horizontal form/fill/seal apparatus, individual pouches are formed by folding the multi-layer film in half followed by providing vertical seals along the length of the folded web and separating the pouches along the seals formed by vertical sealing. (Optionally, the bottoms of the pouches can also be sealed). After the pouch thusly formed is filled, the top of the pouch is sealed.

Similarly, in vertical form/fill/seal apparatus, the continuous web is formed around a tube and the web is immediately joined together by a longitudinal sealing jaw as either a lap seal or a fin seal. A lap seal is depicted schematically in FIGS. 1 and 1a of U.S. Pat. No. 5,888,648 to Donovan, et al. A fin seal is depicted schematically in FIGS. 2 and 2a of U.S. Pat. No. 5,888,648.

A second sealing function is present in a VFFS configuration which consists of a combination top- and bottom-sealing section (with a bag cut-off device in between). The top-sealing portion seals the bottom of an empty bag suspended from the bag forming tube while the bottom portion seals the top of a filled bag.

As a consequence of processing high-barrier property multi-layer films in high speed form/fill/seal apparatus, damage can occur to metallized layers provided as a barrier to oxygen and water vapor.

In order, therefore, to provide high-barrier multi-layer film with suitable seals, several factors must be considered. It is important to provide a sealing capability at as low a temperature as practical in order to maintain, among other things, stereoregularity imposed during orientation, little or no film shrinkage, retention of film and/or chemical additive properties, and highly consistent quality sealing capabilities. Furthermore, the film must have surface characteristics which permit it to be readily used on high-speed machinery. For example, the coefficient of friction must be such that it can be readily unrolled from a high volume roll of film and passed through the packaging machinery. Undesirable sticking or friction characteristics can cause bag imperfections and interruption of high-speed processing. Moreover, seals formed during the process must have good seal strength.

More recently, the packaging artisan has been concerned with the ability to provide quality seals which preserve the freshness of the contents while providing the consumer with an easily openable and reclosable container. Innovations to date have been primarily concerned with the components of the seal material. For example, U.S. Pat. No. 3,202,528 to James describes an oriented polypropylene film having an adherent heat-sealable coating which includes a material from the group consisting of copolymers of vinylidene chloride and acrylonitrile, copolymers of vinyl chloride and vinyl acetate, chlorinated rubbers, nitrocellulose and polyamide which melts below 160° C. and an acidic material provided in an amount of about 20 to about 60% by weight of the film forming material. This adhesive is coated and dried on the film. U.S. Pat. No. 4,020,228 to Eastes describes a gel composition which provides a heat sealable surface to polyolefinic materials or cellulosic sheet materials. U.S. Pat. No. 4,121,956 discloses an ionomer adhesive adhered to an outer ionomeric surface of package wrapping for attachment of labels.

U.S. Pat. No. 4,292,882 discloses an oriented heat-sealable anti-static polypropylene film manufactured by applying to a surface of a base polypropylene film a heat-sealable olefinic polymer containing between 0.2 and 10% by weight of an anionic hydrocarbyl sulfonate. Andrews, et al. also provide that a slip agent can be incorporated for ease of handling.

U.S. Pat. No. 4,389,450 to Schaefer, et al. describes a multi-layer packaging film in which the outer polymeric layers cooperate to provide a relatively constant coefficient of friction differential. This enhances the ability to use the film in high speed processing to form fin seal and lap seals. Schaefer, et al. have addressed the problem of providing the proper coefficient of friction for use of the film in high-speed processing apparatus.

U.S. Pat. No. 5,049,436 to Morgan, et al. discloses a multi-layer film which is hermetically heat sealable over a broad temperature range. The Morgan, et al. patent describes a heat-sealable layer which includes an ethylene-propylene copolymer and/or an ethylene-propylene-butene terpolymer with an inorganic anti-block agent and a fatty acid amide.

U.S. Pat. No. 5,153,074 to Migliorini discloses a high barrier film which has been metallized. The Migliorini '074 patent describes a metallized multi-layer film having a polymer substrate at least one surface of which includes a maleic anhydride modified polypropylene homopolymer or copolymer, and at least one surface having a skin layer thereon of ethylene-vinyl alcohol copolymer, such skin layer having an aluminum layer directly thereon. The ethylene-vinyl alcohol copolymer layer provides excellent oxygen barrier properties and is described as ranging in thickness from 3 to 30 gauge units.

U.S. Pat. No. 5,888,648 to Donovan, et al. discloses a multi-layer film which is hermetically heat sealable. The thickness and composition of layers are selected to avoid tunneling in seals, as well as to avoid z-direction tears when sealed bags are opened.

SUMMARY

There is provided a multilayer polymeric film comprising:
(a) a core layer comprising a thermoplastic polymer; and
(b) an adhesion promoting layer comprising a graft copolymer of syndiotactic polypropylene and an ethylenically unsaturated monomer containing either two carboxylic acid groups or an acid anhydride functionality.

DETAILED DESCRIPTION

Isotactic polypropylene has been grafted with maleic anhydride. Examples of such grafted isotactic polypropylene copolymers include AT11152A or ADMER QF500A sold by Mitsui. It appears that grafted syndiotactic polypropylene copolymers provide a more effective adhesion promoting surface.

Figure 1:
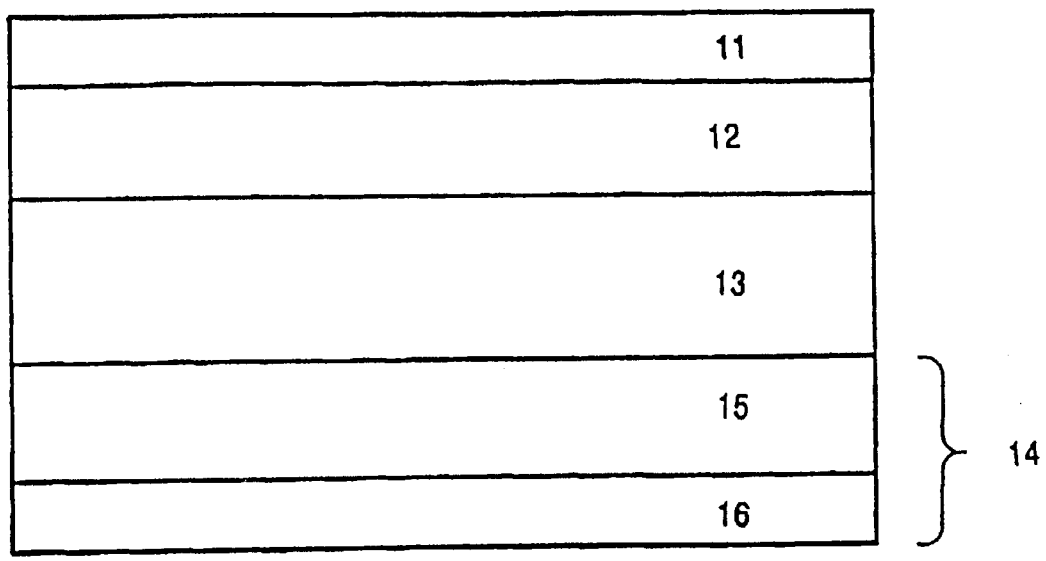
FIG. 1 is an exaggerated cross-section of metallized, biaxially oriented, polypropylene multi-layer film.

In FIG. 1, an optional metal layer 11 is applied to an adhesion promoting layer 12. The metal layer 11 can be aluminum. Instead of a metal layer 11, printing inks, laminating adhesives or primerless overcoats may also be applied to the surface of the adhesion promoting layer 12.

The skin layer 12 is an adhesion promoting layer comprising a graft copolymer of syndiotactic polypropylene and an ethylenically unsaturated monomer containing either two carboxylic acid groups or an acid anhydride functionality. Examples of such ethylenically unsaturated monomers include maleic anhydride, maleic acid, fumaric acid, itaconic acid citraconic acid and citraconic anhydride.

The syndiotactic polypropylene component of the graft copolymer may be a metallocene-catalyzed syndiotactic polypropylene. By the phrase "metallocene-catalyzed syndiotactic polypropylene," it is meant that the syndiotactic polypropylene possesses a molecular structure that corresponds or substantially corresponds to a syndiotactic polypropylene obtained by using an appropriate metallocene catalyst in the polymerization of propylene.

Syndiotactic polypropylene preferably has a melt flow (ASTM D1238) of about 1 to about 15 g/10 minutes, preferably about 2 to about 10 g/10 minutes, most preferably about 4 to about 7 g/10 minutes. Additionally, the syndiotactic polypropylene may have a syndiotacticity of about 70–90% based on racemic pentads and 80–98% based on racemic dyads (measured according to $^{13}C$ NMR spectroscopy), preferably 75–85% based on racemic pentads.

The graft copolymer of syndiotactic polypropylene and maleic anhydride in skin layer 12 may be N99033, produced by the Fina Oil & Chemical Company. The mole percent of maleic anhydride in this graft copolymer may be from 0.1% to 60%. The graft copolymer of the syndiotactic polypropylene and maleic anhydride may have a melt flow rate of from 4 to 20 g/10 min.

In FIG. 1, layer 13 is a core layer. The core layer comprises a thermoplastic polymer which has properties suitable for extrusion or coextrusion. The extruded or coextruded film may be biaxially oriented in the machine and transverse directions under elevated temperature so as to form a multi-layer film. Although the preferred thermoplastic polymer of the core layer is a polypropylene homopolymer, other polymers may be used. These polymers include polymers made from one or more 2 to 5 carbon atom olefins, such as ethylene or butene-1, or a polymer made predominantly of propylene with minor amounts of another olefin, usually a 2 or 4 carbon atom olefin.

Optionally, the core layer comprises an antistatic agent or other additives in addition to the thermoplastic polymer. The antistatic agent may be selected from, e.g., glycerol monostearate (GMS), a tertiary amine and/or a blend of GMS and tertiary amine. Suitable amounts for the antistatic agent may range from about 0.05% to about 3 weight %, based upon on the weight of the core layer.

The polypropylene of layer 13 may be the homopolymer Fina 3371 sold by the Fina Oil & Chemical Company. The polypropylene of layer 13 may be a homopolymer or a copolymer. Propylene homopolymers for layer 13 include isotactic polypropylene, preferably 80–99% isotactic polypropylene, most preferably about 95% isotactic polypropylene. The propylene homopolymers preferably have a melt flow (measured in accordance with the standard ASTM D1238 method) ranging from about 1.2 to about 10 g/10 minutes, most preferably from about 2.5 to about 6 g/10 minutes. Particular propylene copolymers include (98-93)/(2-7) propylenelethylene copolymers.

When coextruded, the adhesion promoting layer 12 adheres well to a polypropylene layer 13. Accordingly, a tie layer or an adhesive layer is not needed to laminate the adhesion promoting layer 12 to the core layer 13. However, one or more such a tie or adhesive layers (not shown in FIG. 1) may be optionally used.

Figure 2:
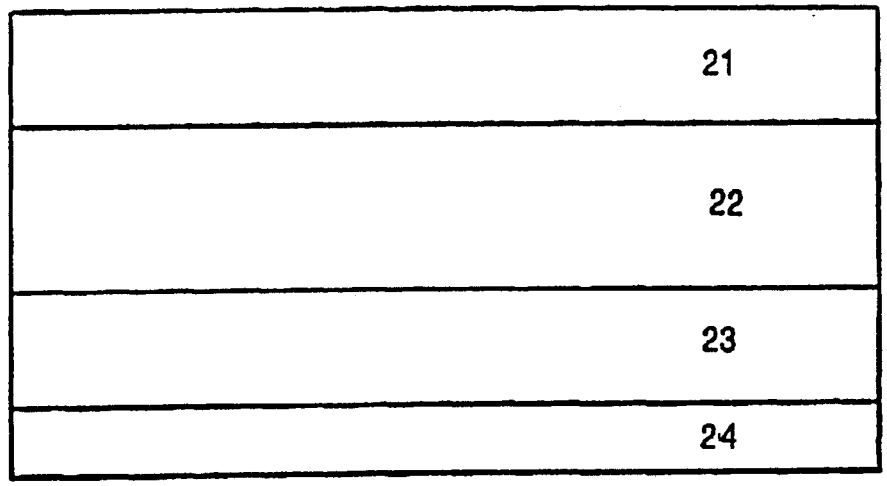
FIG. 2 is an exaggerated cross-section of non-metallized multi-layer film, which may, optionally, be laminated to the metallized film shown in FIG. 1.

On the opposite side of the core layer 13 from the adhesion promoting layer 12, there may be provided one or more under layers 14 adapted for forming a heat seal in a packaging apparatus or for providing a surface suitable for lamination onto another multi-layer film, such as the film described in FIG. 2. When a single layer 14 is used, this layer 14 may comprise a terpolymer of ethylene, propylene and butylene; an ethylene-propylene copolymer; an ethylene-butylene copolymer; high density polyethylene (HDPE); low density polyethylene (LDPE); linear low density polyethylene (LLDPE); very low density polyethylene (VLDPE); ultra low density polyethylene (ULDPE); or mixtures thereof Two under layers 14 may be used. These two layers are shown as layer 15 and layer 16 in FIG. 1. Layer 15 may comprise a terpolymer of ethylene, propylene and butylene; an ethylene-propylene copolymer; an ethylene-butylene copolymer; HDPE; LDPE; LLDPE; VLDPE; ULDPE; or mixtures thereof.

The terpolymer of layer 15 may, optionally, be blended with a linear low density polyethylene (LLDPE), such as LL3003 sold by Exxon. The weight percent of LLDPE, based on total LLDPE plus terpolymer, may be from zero to 70%.

Layer 16 may comprise a terpolymer of ethylene, propylene and butylene; an ethylene-propylene copolymer; an ethylene-butylene copolymer; a polyethylene, such as HDPE, LDPE, LLDPE, VLDPE or ULDPE; or mixtures thereof The polymer of layer 16 may have a melting point lower than the melting point of the polymer in layer 15.

Metallocene catalyzed polyethylenes may be used in the outer layer 16, particularly in view of their adhesion performance. Such metallocene catalyzed polyethylene includes homopolymers as well as copolymers, and may be produced according to known polymerization techniques. Typically, ethylene and optional comonomers are contacted with a catalyst composition comprising at least one metallocene compound and at least one activator under polymerization conditions.

The activators that may be used in combination with the metallocene compounds include, but are not limited to, aluminoxanes and substituted aluminoxanes as well as various ionic compounds.

The metallocene catalyzed polyethylene in layer 16 may have a melt index of about 0.1 to about 10 g/10 minutes (measured in accordance with ASTM D1238), a density of about 0.88 to about 0.965 g/cm$^3$, a polydispersity $M_w/M_n$ of about 2 to about 10, and a melting point of about 90 to about 140° C.

Commercially available metallocene catalyzed polyethylenes include Dow AFFINITY PL-1840 and DPF-1340 and Exxon EXXACT 3027. In comparison to traditional Ziegler-Natta catalyzed propylene copolymer and terpolymer materials, metallocene catalyzed polyethylene materials exhibit significantly narrower molecular weight distributions.

Layer 16 may, optionally, be provided with one or more anti-blocking agents. Examples of such aniti-blocking agents include Epostar 1010 and Sylobloc 44. Epostar 1010 is sold by Nippon Shokubai, and this anti-blocking agent is composed of spherical, cross-linked copolymers of methyl methacrylate and propylidene trimethacrylate with a particle size (i.e. average diameter) of about 7–11 microns.

Sylobloc 44 is a silica antiblocking agent. The average particle size is about 4–5 microns. Oil adsorption is about 300 (g/100 g). The pH value is about 6–8. Sylobloc 44 is made by the Grace Davison Company.

Layer 12 may have a thickness of 2–5 gauges. Layer 13 may have a thickness of 40–200 gauges. Layer 15 may have a thickness of 15–45 gauges. Layer 16 may have a thickness of 2–10 gauges. The metal layer 11 may have a thickness of 300 to 500 angstroms.

Layers 12, 13, 15 and 16 may be laminated together by a coextrusion process before the metal layer 11 is applied. The metal layer 11 may be applied by chemical vapor deposition.

Deposited metal layers are well known in the art, and can be deposited using any known method, for instance, vacuum deposition, electroplating, sputtering, etc. Preferably, the metal layer is one of vacuum-deposited aluminum, copper, silver, chromium, gold, and mixtures thereof, with aluminum being most preferred.

The metallized multi-layer films of the present invention retain excellent barrier properties against oxygen and water vapor transmission, even after being processed through a packaging machine, such as a VFFS machine. For example, the oxygen transmission rate (OTR) of the multi-layer film of the present invention may be less than 5 cc/100 in$^2$/24 hours (as measured by Mocon 1000 at 0% relative humidity and 23° C.), while the water vapor transmission rate (WVTR) may be less than 0.06 g/100 in$^2$/24 hours (as measured by Mocon W600 at 90% relative humidity and 38° C.), even after the film is processed through a packaging machine at an accelerated rate.

Oxygen transmission rate may be measured by a reliable method, such as ASTM D3985. In particular, OTR may be measured with a Mocon OXYTRAN 1000 instrument (available from Modern Controls, Inc., Elk River, Minn.) at 23° C. and 0% relative humidity.

Water vapor transmission rate may also be measured by a reliable method, such as ASTM F1249. In particular, WVTR may be measured with a Mocon PERMATRAN W600 instrument (available from Modern Controls, Inc., Elk River, Minn.) at 38° C. and 90% relative humidity.

In order to modify or enhance certain properties of multi-layer films, it is possible for one or more of the layers to contain appropriate additives in effective amounts. Such additives include, but are not limited to anti-blocks, anti-static agents, coefficient of friction (COF) modifiers, processing aids, colorants, clarifiers, and other additives known to those skilled in the art.

Also, one or more exposed layers of multi-layer films can be surface-treated to render the films receptive to printing inks, adhesives and/or coatings. These surface-treated layers may subsequently be laminated to other films or surfaces. The surface treatment can be carried out by any method known in the art such as corona discharge treatment or flame treatment.

Optionally, a coating may be applied to one or both of the exposed surfaces of outermost layers of a film to facilitate lamination. Prior to application of the coating material, the film may or may not be surface treated or may or may not be primed with a primer layer. Appropriate coatings contemplated include acrylic coatings such as those described in U.S. Pat. Nos. 3,753,769 and 4,865,908, both of which are incorporated herein by reference, and PVDC coatings such as those described in U.S. Pat. Nos. 4,214,039; 4,447,494; 4,961,992; 5,019,447 and 5,057,177, all of which are incorporated herein by reference. A vinyl alcohol polymer may also be used as a coating composition, such as VINOL 325, available from Air Products Inc.

Appropriate primer materials are poly(ethyleneimine), epoxy primers, and the like.

The outer surface of a film may be treated as noted above to increase its surface energy and therefore insure that the coating layer will be strongly adherent thereto thereby reducing the possibility of the coating peeling or being stripped from the film. This treatment can be accomplished employing known techniques, such as, for example, film chlorination, i.e., exposure of the film surface to aqueous chlorine, treatment with oxidizing agents such as chromic acid, hot air or steam treatment, and the like. Although any of these techniques are effectively employed to pretreat the film surface, a particularly desirable method of treatment is the so-called corona discharge treatment method which comprises exposing the film surface to a high voltage corona discharge while passing the film between a pair of spaced electrodes. After corona discharge treatment of the film surface, the coating composition is then applied thereto.

Treated or untreated surfaces may be laminated together with a suitable adhesive, e.g., a hot melt adhesive such as low density polyethylene, ethylene-methacrylate copolymer, water-based adhesives such as polyvinylidene chloride latex, and the like.

The extruded film can be stretched in the machine direction, coated with a coating composition and then stretched perpendicularly in the transverse direction. In yet another embodiment, coating can be carried out after biaxial orientation is completed.

The film of the invention may have a total thickness ranging from about 0.2 mil to about 5 mils, specifically from about 0.4 mil to about 2.5 mils.

Multi-layer films may be prepared employing commercially available systems for coextrusion.

It is preferred that layers containing polypropylene are coextruded. Thereafter, the film is biaxially oriented. Specifically, the polymers are brought to the molten state and coextruded from a conventional extruder through a flat sheet die, the melt streams are combined in an adapter prior to being extruded from the die or within the die. After leaving the die, the multi-layer web is chilled and the quenched web is reheated and oriented. The film is oriented by biaxially stretching the film. Films having a homopolymer polypropylene core can be oriented by stretching from about 3 to about 11 times in the machine direction at temperatures ranging from about 105° C. to about 150° C. and from about 3 to about 12 times in the transverse direction (TD) at temperatures ranging from about 150° C. to about 165° C.

FIG. 2 shows an example of a second multi-layer film, which may, optionally, be laminated to the multi-layer film shown in FIG. 1. This lamination helps to protect the metal layer. This lamination also serves to enhance the structural stiffness of the film to aid in the passing of the film through the packaging machine.

Layer 21 of FIG. 2 is adapted to be laminated onto the metallized, multi-layer film of FIG. 1 by an adhesive or a tie layer. Layer 21 may be composed of a terpolymer of ethylene, propylene and butylene, such as Chisso 7502 sold by the Chisso Chemical Company of Japan. Layer 21 may have a thickness of about 5 gauges.

Layer 22 of FIG. 2 is a polypropylene layer which may have the same composition and thickness as the polypropylene layer 13 of FIG. 1. Similarly, layer 23 of FIG. 2 may have the same composition and thickness as layer 15 of FIG. 1, and layer 24 of FIG. 2 may have the same composition and thickness as layer 16 of FIG. 1. Layers 23 and 24 are adapted to form a heat seal during the packaging process.

COMPARATIVE EXAMPLE 1

In this Comparative Example a film structure is prepared comprising a metallized three layer coextruded biaxial oriented film. The order of layers in the metallized film is referred to herein as A/B/C for the three layers. Layers A/B/C correspond to layers 12/13/14, respectively, of FIG. 1. Skin layer A (layer 12) is prepared from a high density polyethylene (HDPE) sold as Equistar 6030. Inner layer B (layer 13), which is between layer A and C (layer 12 and 14), is prepared from Fina 3371 polypropylene sold by Fina Oil & Chemical Company. Layer C (layer 14) is a heat sealable layer prepared from a terpolymer. The three-layered film is oriented about 5 times in the machine direction and eight times in the transverse direction by the tenter frame process. Layer A (layer 12) is flame treated. Aluminum is deposited by vacuum metallization (layer 11) on the top of the treated Layer A (layer 12).

The metallized film made as described here, in routine commercial production, has a water vapor transmission rate that averages 0.015 g/100 in$^2$/day.

EXAMPLE 1

A metallized film corresponding to that of Comparative Example 1 was prepared, except that the HDPE of Layer A was replaced with N99033, which is a maleic anhydride grafted syndiotactic polypropylene sold by the Fina Oil & Chemical Company.

In replicated tests, the water vapor transmission rate of the metallized film averaged 0.010 g/100 in$^2$/day.

What is claimed is:

1. A multilayer, coextruted polymeric film comprising:
   (a) a core layer comprising a thermoplastic polymer; and
   (b) an adhesion-promoting layer comprising a graft copolymer of syndiotatic polypropylene and an ethylenically unsaturated monomer containing either two carboxylic acid groups or an acid anhydride functionality,
   wherein said film is biaxially oriented.

2. A film according to claim 1, wherein said ethylenically unsaturated monomer containing either two carboxylic acid groups or an acid anhydride functionality is selected from the group consisting of maleic anhydride, maleic acid, fumaric acid, itaconic acid, citraconic acid and citraconic anhydride.

3. A film according to claim, 1, wherein said graft copolymer is a graft copolymer of syndiotactic polypropylene and maleic anhydride.

4. A film according to claim 1, wherein said core layer is a polypropylene layer.

5. A metallized film, wherein the adhesion-promoting layer of a multilayer, coextruded, biaxially oriented polymeric film according to claim 4 has been metallized with aluminum.

6. A laminate comprising a non-metallized film laminated to the metallized layer of a metallized film according to claim 1.

7. A metallized film according to claim 5, further comprising a skin layer on a surface of the core layer opposite the metallized adhesion-promoting layer, wherein the skin layer comprises a polymer selected from the group consisting of a terpolymer of ethylene, propylene and butene; an ethylene-propylene copolymer; an ethylene-butylene copolymer; HDPE; LDPE; LLDPE; VLDPE; ULDPE ; and mixtures thereof.

8. A film according to claim 1, wherein said syndiotactic polypropylene is a metallocene-catalyzed syndiotactic polypropylene.

9. A multilayer, coextruded polymeric film comprising:
   (a) a core layer comprising a thermoplastic polymer; and
   (b) an adhesion-promoting layer consisting of (i) a graft copolymer of syndiotactic polypropylene and an ethylenically unsaturated monomer containing either two carboxylic acid groups or an acid anhydride functionality and, optionally, (ii) at least one additive selected from the group consisting of anti-blocks, anti-static agents, coefficient of friction (COF) modifiers, processing aids, colorants, and clarfiers,
   wherein said film is biaxially oriented.

10. A film according to claim 9, wherein the adhesion-promoting layer (b) has a thickness of from 2 to 5 gauges.

* * * * *